United States Patent [19]
Gangopadhyay et al.

[11] Patent Number: 6,011,559
[45] Date of Patent: *Jan. 4, 2000

[54] LAYOUT METHOD FOR ARC-DOMINATED LABELLED GRAPHS

[75] Inventors: Dipayan Gangopadhyay, Yorktown Heights, N.Y.; Subrata Mitra, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/747,414

[22] Filed: Nov. 12, 1996

[51] Int. Cl.[7] .................................................. G06F 15/00
[52] U.S. Cl. ........................ 345/440; 345/438; 345/435
[58] Field of Search .................................... 345/440, 438, 345/435; 707/512

[56] References Cited

U.S. PATENT DOCUMENTS

| | | | |
|---|---|---|---|
| 4,845,665 | 7/1989 | Heath et al. | 345/333 |
| 5,233,688 | 8/1993 | Too | 345/440 |
| 5,247,651 | 9/1993 | Clarisse | 395/500 |
| 5,257,363 | 10/1993 | Shapiro et al. | 395/500 |
| 5,278,951 | 1/1994 | Camacho et al. | 345/440 |
| 5,315,709 | 5/1994 | Alston, Jr. et al. | 707/6 |
| 5,325,533 | 6/1994 | McInerney et al. | 395/701 |
| 5,390,320 | 2/1995 | Smithline | 395/500 |
| 5,390,330 | 2/1995 | Talati | 395/703 |
| 5,421,015 | 5/1995 | Khoyi et al. | 395/677 |
| 5,437,037 | 7/1995 | Furuichi | 395/707 |
| 5,440,675 | 8/1995 | Matsunaga et al. | 345/440 |
| 5,515,487 | 5/1996 | Beaudet et al. | 345/440 |
| 5,515,497 | 5/1996 | Itri et al. | 345/340 |
| 5,522,022 | 5/1996 | Rao et al. | 345/440 |
| 5,528,503 | 6/1996 | Moore et al. | 364/468.01 |
| 5,537,630 | 7/1996 | Berry et al. | 345/326 |
| 5,542,040 | 7/1996 | Chang et al. | 345/326 |
| 5,555,365 | 9/1996 | Selby et al. | 345/335 |
| 5,557,518 | 9/1996 | Rosen | 380/24 |
| 5,606,654 | 2/1997 | Schuur | 345/440 |
| 5,651,105 | 7/1997 | Willman | 345/440 |
| 5,689,717 | 11/1997 | Pritt | 345/433 |
| 5,724,072 | 3/1998 | Freeman et al. | 345/438 |
| 5,734,580 | 3/1998 | Rakov | 364/488 |
| 5,845,270 | 12/1998 | Schatz et al. | 345/440 |
| 5,877,775 | 3/1999 | Theisen et al. | 345/440 |

OTHER PUBLICATIONS

Citrin, Wayne, et al., "Using Formalized Temporal Message–flow Diagrams," *Software–Practice and Experience*, vol. 25, No. 12, pp. 1367–1401, Dec. 1995.

Coats, Mark, et al., "Constructing Operational Specifications," *Dr. Dobb's Journal of Software Tools for Professional Programmer*, vol. 20, No. 6, pp. 18–33, Jun. 1995.

De Man, Josef, et al., "Towards a formal Semantics of Message Sequence Charts", *SDL 93 Using Objects. Proceedings of the Sixth SDL Forum 1993*, pp. 157–165, 1993.

De Man, Jozef, et al., "Developing Formal Specifications with Message Sequence Charts", *XIV International Switching Symposium*, vol. 2, pp. 134–137, Oct. 1992.

(List continued on next page.)

*Primary Examiner*—Mark K. Zimmerman
*Assistant Examiner*—Albert K. Lee
*Attorney, Agent, or Firm*—Gates & Cooper

[57] ABSTRACT

A method, apparatus, and article of manufacture for laying out an arc-dominated labelled graph using a computer. The display area is divided into a two dimensional grid of rows and columns. Each node of the labelled graph is assigned to a column, and each arc of the labelled graph is assigned to a row. When laying out arcs, four conditions are observed. First, two arcs connected to the same node are assigned different rows. Second, two arcs assigned to the same row do not have an overlap in the columns. Third, an arc with a distinct source node and a destination node is represented as a line from the source node to the destination node. Fourth, an arc describing a self-loop is represented as one or more lines in the row. The invention produces graphs which have no overlapping arc labels and is scalable for large graphs by expanding the number of rows and columns.

15 Claims, 9 Drawing Sheets

OTHER PUBLICATIONS

Ek, Anders, "Verifying Message Sequence Charts with the SDT Validator," *SDL '93. Using Objects. Proceedings of the Sixth SDL Forum 1993*, pp. 237–249.

Grabowski, Jens, et al., "The Standardization of Message Sequence Charts," *Proceedings 1993: Software Engineering Standards Symposium*, pp. 48–63, 1993.

Graubmann, Peter, et al., "Towards a Petri Net Based Semantics Definition for Message Sequence Charts,"*SDL 93: Using Objects*, pp. 179–190, 1993.

Hadzilacos, Thanasis, et al., "Transaction Synchronisation in Object Bases", *Journal of Computer and System Sciences*, vol. 43, pp. 2–24, 1991.

Ito, Atsushi, et al., "Transformation Technique Between Specification in SDL and Specification in Message Sequence Charts for Designing Protocol Specifications," *Supercomm/ICC '92: Discovering a New World of Communications*, IEEE vol. 1, pp. 0442–0447, 1992.

Ladkin, Peter B., et al., "What do Message Sequence Charts Mean?", *IFIP Trans., C. Commun. Syst.*, vol. C, No. 22, pp. 301–316, 1994.

Ladkin, Peter B., et al., "Interpreting Message Flow Graphs," *Formal Aspects of Computing 1995*, vol. 7, No. 5, pp. 473–509, 1995.

Mauw, S., et al., "An Algebraic Semantics of Basic Message Sequence Charts," *The Computer Journal*, vol. 37, No. 4, pp. 269–277, 1994.

Mauw, S., et al., "A Formal Semantics of Synchronous Interworkings," *SDL '93 Using Objects: Proceedings of the Sixth SDL Forum 1993*, pp. 167–178.

Moriyasu, Kenji, et al., "A Method of Applying Message Sequence Chart Specifications for Services with Variant Process Structure," *Electronics and Communications in Japan*, Part 1, vol. 78, No. 9, pp. 12–24, 1995.

Okamoto, Mitsuhiro, et al., "A Verification Scheme for Service Specifications Described by Information Sequence Charts," *IEICE Trans. Commun.*, vol. E75–B, No. 10, pp. 978–985, Oct. 1992.

Thrampoulidis, K.X., et al., "Object Interaction Diagram: A New Technique in Object–oriented Analysis and Design," *Journal of Object–Oriented Programming*, vol. 8, No. 3, pp. 25–32, Jun. 1995.

LAYOUT METHOD FOR ARC-DOMINATED LABELLED GRAPHS

CROSS-REFERENCE TO RELATED APPLICATIONS

This application is related to the following co-pending and commonly-assigned patent applications:

Application Ser. No. 08/747,415, entitled "METHOD FOR SYNCHRONIZING CLASS, METHODS, ATTRIBUTES AND OBJECT PROPERTIES ACROSS AN OBJECT-ORIENTED SYSTEM," filed on same date herewith, by Stephen A. Brodsky, Timothy J. Grose and Roni Korenshtein, attorney's docket number ST9-96-030;

Application Ser. No. 08/747,417, entitled "NOTIFICATION MANAGER FOR AN OBJECT-ORIENTED SYSTEM," filed on same date herewith, by Stephen A. Brodsky and Timothy J. Grose, attorney's docket number ST9-96-059;

Application Ser. No. 08/747,416, entitled "MULTI-OBJECT VIEWS IN AN OBJECT MODELING TOOL," filed on same date herewith, by Roni Korenshtein, attorney's docket number ST9-96-062;

Application Ser. No. 08/747,057, entitled "INTERACTIVE MODELING AGENT FOR AN OBJECT-ORIENTED SYSTEM," filed on same date herewith, by Stephen A. Brodsky and Rebecca Mei-Har Lau, attorney's docket number ST9-96-060;

Application Ser. No. 08/747,058, entitled "EXECUTION ENGINE IN AN OBJECT MODELING TOOL," filed on same date herewith, by Stephen A. Brodsky, Gary C. Doney, Dipayan Gangopadhyay, Michael M. Golding, Rajenda Bhagwatisingh Panwar, and Subrata Mitra, attorney's docket number ST9-96-063;

all of which applications are incorporated by reference herein.

BACKGROUND OF THE INVENTION

1. Field of the Invention

This invention relates in general to graphical computer systems, and in particular, to a layout method for arc-dominated labelled graphs.

2. Description of Related Art

Arc-dominated graphs are those that contain most of the visible information in their arc labels. An example of such graphs is a finite state machine (FSM) of the Mealy machine variety, which is used extensively in telecommunication protocol design and recent object-oriented computer-assisted software engineering (CASE) tools. Also, in object-oriented analysis and design, it often becomes necessary to draw object-relationship diagrams to depict different usage scenarios. Each diagram typically has a few objects, but there could be a large number of relationships between them.

Currently known layout methods typically give preference to the placement of graph nodes, and are therefore generally not suitable for laying out arc-dominated graphs. For example, these methods tend to avoid laying out arcs which cross nodes, and instead route arcs around the nodes in order to minimize arc cross-overs. However, such methods allow arcs to cross each other. Thus, when used to lay out arc dominated labelled graphs, these prior art methods result in graphs in which arc-labels overlap, making the visible information in the graphs hard to decipher.

In contrast, with arc-dominated graphs, suitable separation between two arcs is an important layout criterion. In these cases, the respective arc labels, which could be rather long strings, should not overlap any arc, node or other label. Thus, there is a need in the art for a layout method for arc-dominated labelled graphs that meets the layout criterion of such graphs.

SUMMARY OF THE INVENTION

To overcome the limitations in the prior art described above, and to overcome other limitations that will become apparent upon reading and understanding the present specification, the present invention discloses a method, apparatus, and article of manufacture for laying out an arc-dominated labelled graph using a computer. The display area is divided into a two dimensional grid of rows and columns. Each node of the labelled graph is assigned to a column, and each arc of the labelled graph is assigned to a row. When laying out arcs, four conditions are observed. First, two arcs connected to the same node are assigned different rows. Second, two arcs assigned to the same row do not have an overlap in the columns. Third, an arc with a distinct source node and a destination node is represented as a line from the source node to the destination node. Fourth, an arc describing a self-loop is represented as one or more lines having an identical source and destination node in the row.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

The preferred embodiment of the present invention provides a computerized layout method for an arc-dominated labelled graph. The method uses a display area that is divided into a two dimensional grid of rows and columns. The method produces a layout that stretches along both the horizontal and vertical coordinate directions of a display area of the computer to accommodate information contained in the graph.

Hardware Environment

Figure 1:
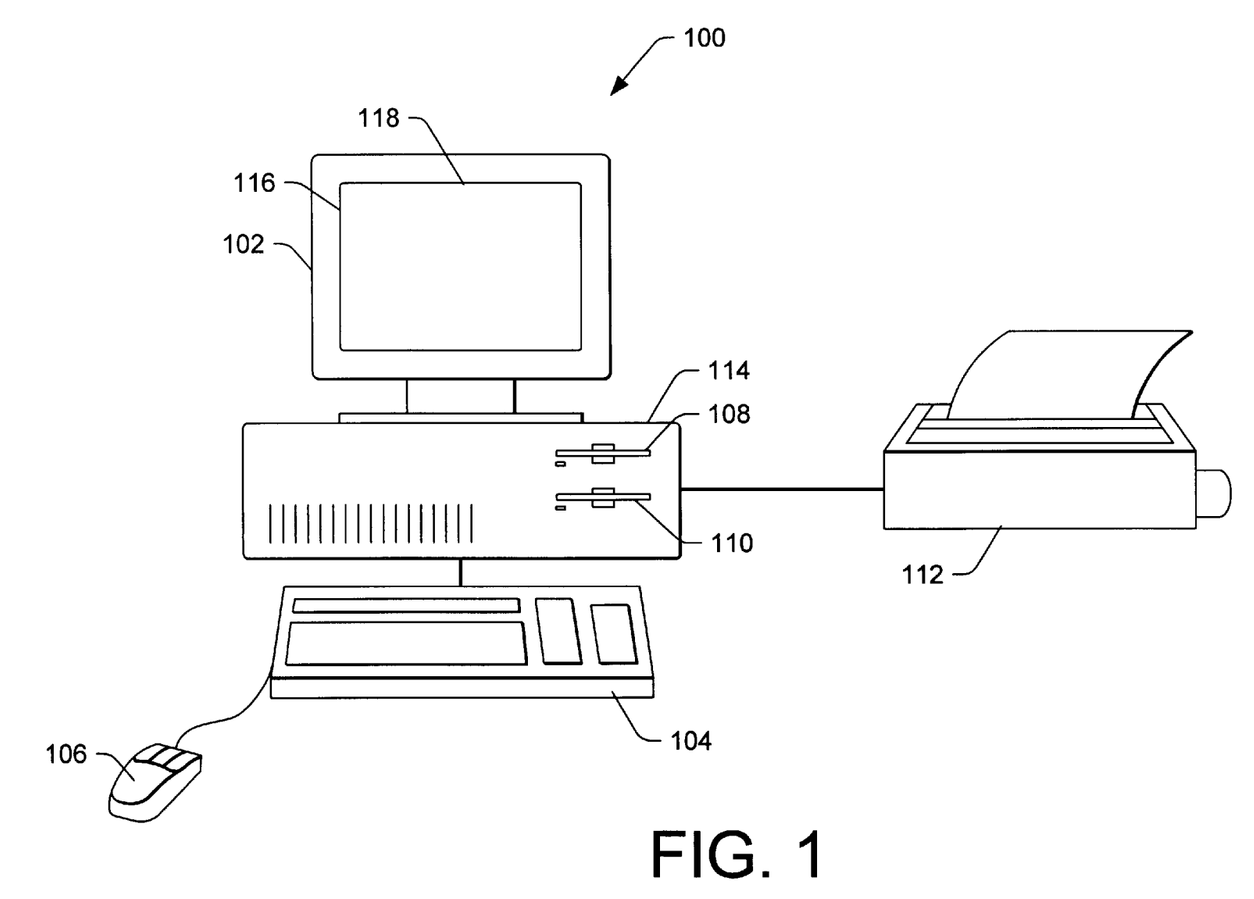
FIG. 1 illustrates an exemplary computer hardware environment compatible with the present invention.

FIG. 1 illustrates an exemplary environment that could be used with the present invention. The present invention is typically implemented using a computer 100, wherein the computer 100 comprises a processor, random access memory (RAM), read-only memory (ROM) and/or other components. The computer 100 may be coupled to I/O devices, such as a monitor 102, keyboard 104, mouse device 106, fixed and/or removable data storage devices 108 and 110, and printer 112. The computer 100 could also be coupled to other I/O devices, including a local area network (LAN) or wide area network (WAN) via interface cable 114. Of course, those skilled in the art will recognize that any combination of the above components, or any number of different components, peripherals, and other devices, may be used with the computer 100.

Generally, the computer 100 operates under control of an operating system 116, which is represented by the display on the monitor 102. The present invention is preferably implemented using one or more computer programs or applications 118, which are represented by the window displayed on the monitor 102 operating under the control of the operating system 116. The operating system 116 and computer program 118 are loaded from a data storage device 108 and/or 110 into the memory of the computer 100 for use during actual operations.

In the preferred embodiment, the operating system 116 and the computer program 118 are tangibly embodied in a computer-readable medium, e.g., data storage devices 108 and/or 110, which could include one or more fixed or removable data storage devices, such as a zip drive, floppy disc drive, hard drive, CD-ROM drive, tape drive, etc. Further, the operating system 116 and the computer program 118 are comprised of instructions which, when read and executed by the computer 100, causes the computer 100 to perform the steps necessary to implement and/or use the present invention. Of course, those skilled in the art will recognize many modifications may be made to this configuration without departing from the scope of the present invention.

Operation

The operation of the computer 100, as controlled by the computer program 118 of the present invention, is described with reference to FIG. 2 through FIG. 6. The present invention is intended to take a difficult-to-read input graph, such as shown in FIG. 2, and transform it into an easier-to-read output graph, such as shown in FIG. 3.

Figure 2:
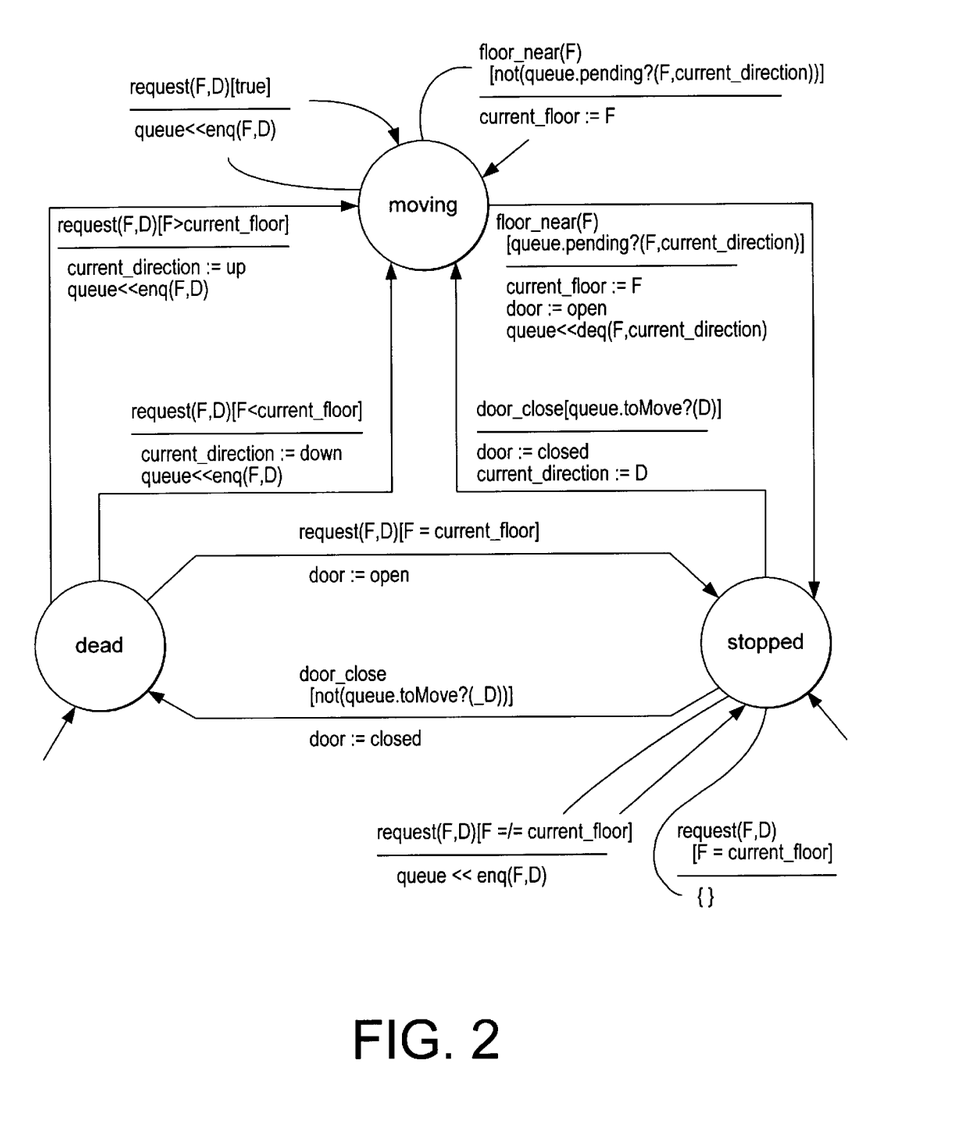
FIG. 2 is an input graph representing a finite state machine (FSM) compatible with the present invention.
Figure 3:
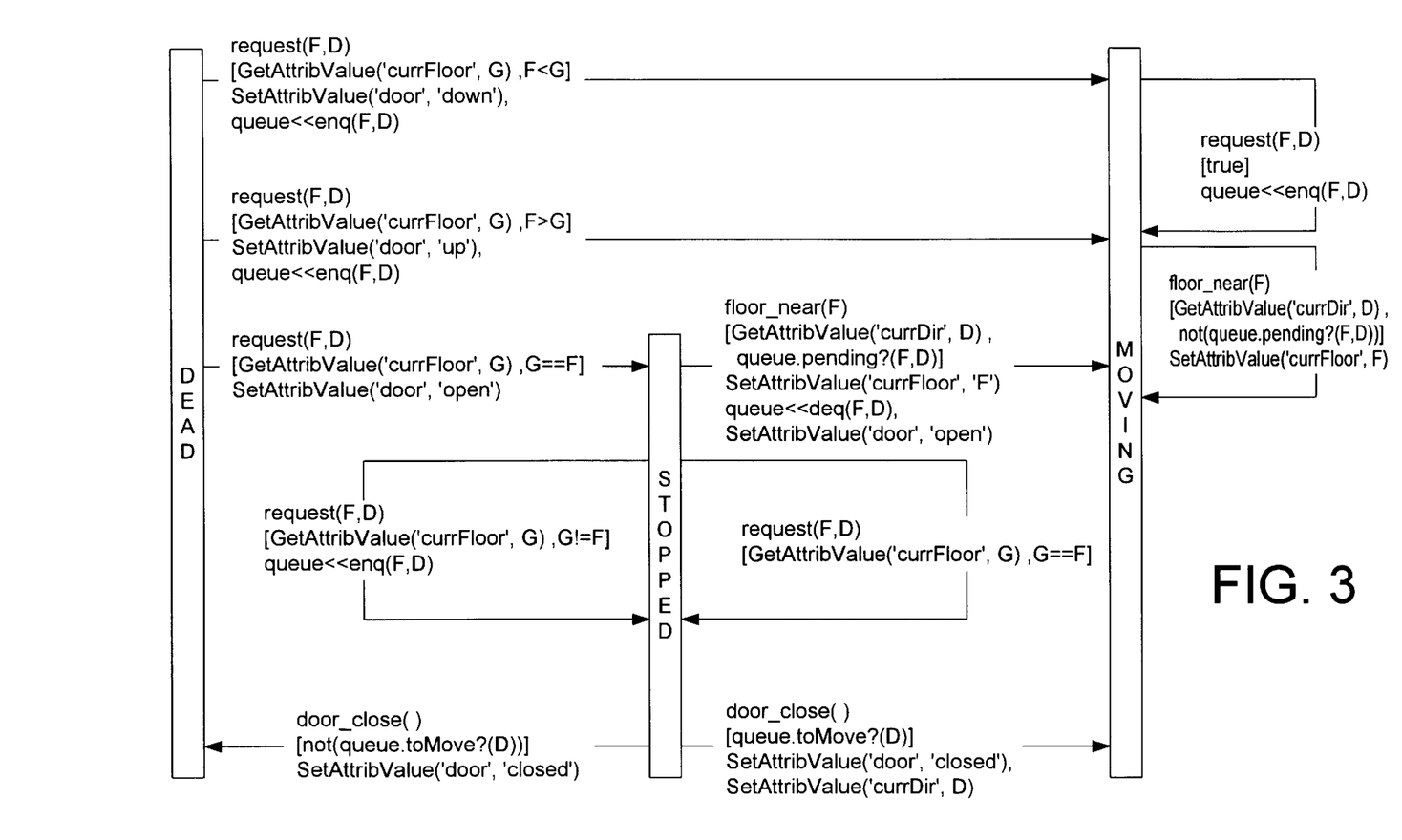
FIG. 3 is an output graph of an arc-dominated labelled graph according to the present invention.

FIG. 2 represents a manually drawn graph of a finite state machine (FSM). The FSM represents the behavior of a simple elevator, and contains three states or nodes. The first node is labelled "dead" and represents the state of the elevator when there are no requests to satisfy. The second node is labelled "stopped" and represents the state of the elevator when the elevator has stopped at any floor to satisfy a request. The third node is labelled "moving" and represents the state in which the elevator is moving between floors. There are several arcs emanating from each node, as described below:

| DEAD | |
| --- | --- |
| D1: | arc to STOPPED, with label:<br>request(F,D) [F==current_floor]<br>door := open |
| D2: | arc to MOVING, with label:<br>request(F,D) [F>current_floor]<br>current direction := up<br>queue<<enq(F,D) |
| D3: | arc to MOVING, with label:<br>request(F,D) [F<current_floor]<br>current_direction := down<br>queue<<eng(F, D) |

In the DEAD state, the elevator only responds to a single message, namely "request". However, the outcome of the single request message can vary depending on two input parameters, "F" for floor-number and "D" for the elevator direction of either UP or DOWN.

The elevator follows arc (D1) when the request is for a floor where the elevator already is. In this case, the elevator need not move at all and it only needs to open the door.

The elevator follows arcs (D2) or (D3) when the floor of the request does not match the current floor and the elevator must move. The elevator makes a transition to the MOVING state, and puts a message in its queue which is checked and removed from the queue of the elevator when the request has been satisfied. The only difference between (D2) and (D3) is in the direction of movement.

| STOPPED | |
| --- | --- |
| S1: | SELF arc, with label:<br>request(F,D)<br>[F==current_floor]<br>{} |
| S2: | SELF arc, with label:<br>request(F,D) [F=/=current_floor]<br>queue<<enq(F,D) |
| S3: | arc to STOPPED, with label:<br>door_close[not(queue.toMove? (_D)]<br>door := closed |
| S4: | arc to MOVING, with label:<br>door_close[(queue.toMove? (D)]<br>door := closed<br>current dir := D |

In the STOPPED state, the elevator responds to either a "request" message or a "door-close" message which represents a timer type of an event. The "door-close" message indicates that the elevator door will close.

The elevator follows either arc (S1) or (S2) when it receives a request. The elevator follows arc (S1) when the request is for a floor where the elevator already is. In this case, the elevator need not move at all and it only needs to open the door. Otherwise, the elevator follows arc (S2) and puts the request into the request queue.

If the elevator receives a "door-close" message, the elevator checks whether there are more requests in the queue. If there are no more requests in the queue, the elevator follows arc (S3) and returns to the DEAD state. Otherwise, the elevator follows arc (S4), closes the elevator door, and moves to the MOVING state.

| MOVING | |
| --- | --- |
| M1: | SELF arc, with label:<br>request(F,D) [true]<br>queue<<enq(F,D) |
| M2: | SELF arc, with label:<br>floor_near(F)<br>[not (queue.pending? (F,current_direction))]<br>current_floor := F |
| M3: | arc to STOPPED, with label:<br>floor_near(F)<br>[queue.pending? (F,current_direction)]<br>current_floor := F<br>door := open<br>queue<<deq(F,current_direction) |

In the MOVING state, the elevator responds to two messages. The first is "request", which the elevator puts into a request queue for future reference by following arc (Ml), and the second is "floor-near", which is an event that comes from the environment of the elevator. The "floor-near" message indicates that the elevator is nearing a certain floor, and the elevator must therefore decide whether it must stop at that floor. To decide if the elevator must stop, the elevator looks at the request queue for a pending request for the floor the elevator is approaching. If there is a pending request, the elevator follows arc (M3) and stops at the floor, or else follows arc (M2) and continues on if there is no request for the approaching floor.

In the present invention, a computerized representation of the manually drawn graph of FIG. 2 is inputted into the computer 100 for manipulation by the computer program 118 to create the output graph of FIG. 3. Under control of the computer program 118, the computer 100 creates a display area on the monitor 102 that is divided into a two dimensional matrix of rows and columns. The two dimensional matrix is used to lay out arcs and nodes in the inputted graph along the horizontal and vertical directions, respectively. Columns of the matrix represent nodes, while rows of the matrix represent one or more arcs. Each node in the matrix preferably has two boolean variables per row, one for the left side and the other for the right side. If an arc is attached to either side of the node, then the boolean variable corresponding to that side indicates that the corresponding side is in use, represented by setting a state variable INUSE. In the case where an arc must cross a node boundary, the state variables for both sides of the node are set to indicate that it is in use. Initially, all boolean variables are set to reflect that sides are not in use. Thereafter, arcs eminating out of each node are placed in appropriate rows of the matrix, and the arcs and nodes are rendered on the screen or other output device. The result is an output graph as illustrated in FIG. 3 displayed on the monitor 10, wherein the output graph layout stretches along both the horizontal and vertical coordinate directions of the display area to accommodate information in the graph.

Implementation

Figure 4:
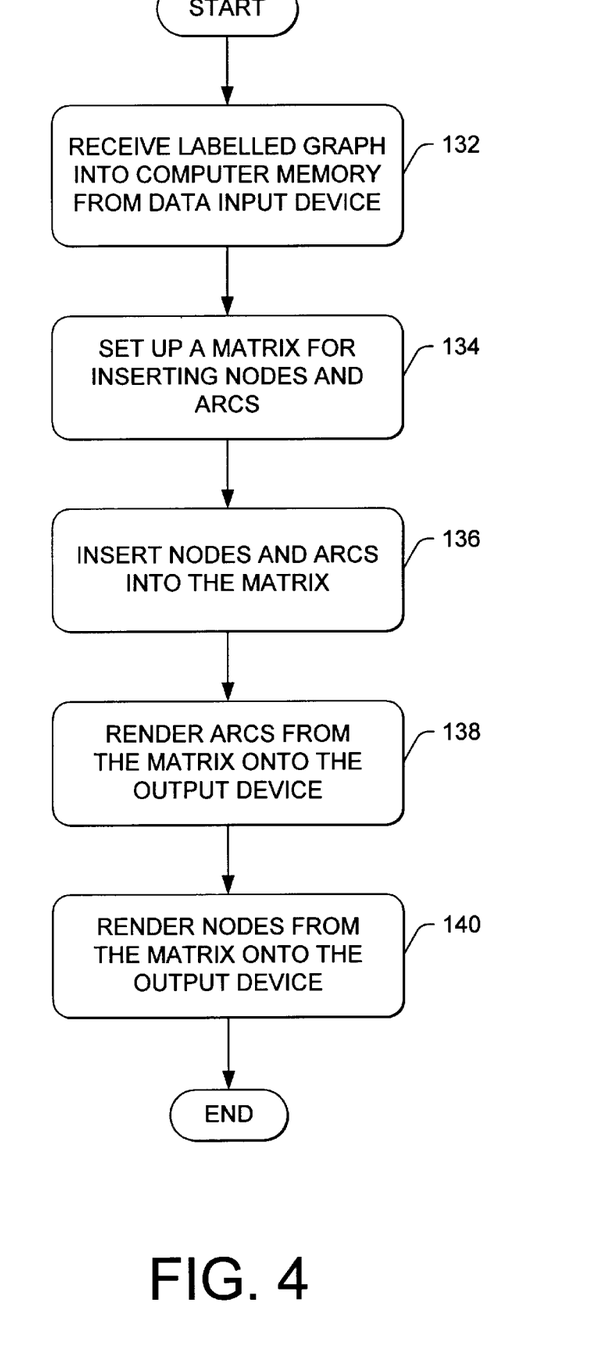
FIGS. 4 and 5 are a flowchart illustrating the steps performed in laying out an arc-dominated labelled graph according to the present invention.

FIG. 4 is a flowchart illustrating the steps performed in laying out an arc-dominated labelled graph according to the present invention. Block 132 represents the computer 100 inputting the arc-dominated labelled graph from a data input device. Block 134 represents the computer 100 setting up a matrix for inserting nodes and arcs. The matrix typically consists of dividing the display area of the monitor 102 into a two dimensional grid comprised of intersecting rows and columns, thereby creating cells, preferably of variable sizes. Block 136 represents the computer 100 inserting each node and arc of the inputted graph to a column, which is represented in the output graph as a rectangle of an appropriate length. Block 138 represents the computer 100 rendering arcs from the matrix onto the monitor 102 by assigning each arc of the inputted graph to a successive row, starting from the top row of the matrix, wherein the following conditions are observed:

(1) two arcs connected to the same node are assigned different rows;

(2) two arcs assigned to the same row do not have an overlap in the columns;

(3) an arc with a distinct source node and a destination node is represented as a line from the middle of the source node to the middle of the destination node; and (4) an arc describing a self-loop is represented as a three section multi-line in the corresponding row, wherein the source node is the destination node.

For each new arc in the graph, a "greedy" process is used by the computer 100 for selecting a row in the matrix for the placement of the arc. A new row is added if the arc cannot be fitted in the existing rows of the matrix, i.e., there are no open rows. An open row is one that can accommodate an arc without violating conditions (1) and (2) given above. Further, the computer 100 follows the following rules in fitting an arc into an open row of the graph.

In a first rule, if the arc is not a SELF loop, where the source node is different from the target node, the computer 100 starts with the first row and looks for the earliest possible row which can fit the arc. An arc can be fitted in a row if: (a) the right side of the source node is not in use, (b) the left side of the target node is not in use, and (c) for each node that appears between the source and target in the matrix, both left and right sides are not in use. In that case, each boolean variable for the node is marked to indicate that it is in use to show that the space is no longer available or open.

In a second rule, if the arc is a SELF loop, where the source node is the same as the target node, the computer 100 looks for the earliest row in which either the left or right side is not in use. For the left-most node, SELF arcs are typically placed to the left of the node, while for the right-most node, SELF arcs are placed to the right of the node.

Block 140 represents the computer 100 rendering nodes from the matrix on the monitor 102. The method of the present invention scales up for large arc-dominated graphs, by allowing consumption of the display area along both the horizontal and vertical coordinate directions. While laying out a large input graph, the following conditions are observed by the computer 100:

(1) Whenever a new node is added, a new column is added to the display space.

(2) A new arc is assigned to an open row. A new row is added if there is no open row. Each new arc may result in a new row. A first-fit strategy is preferably used to accommodate the new arc within the already available rows. If no row is available, a new row is added.

(3) The rows and columns divide the display into cells. The width of a cell is determined by the maximum width of any line of an arc label, while the height of the cell is determined by the number of arc lines in the arc label.

Thus, the vertical height of a cell stretches or shrinks depending on the number of lines in the label. Similarly, the horizontal width of a cell stretches or shrinks depending on the width of lines of the arc label.

Figure 5:
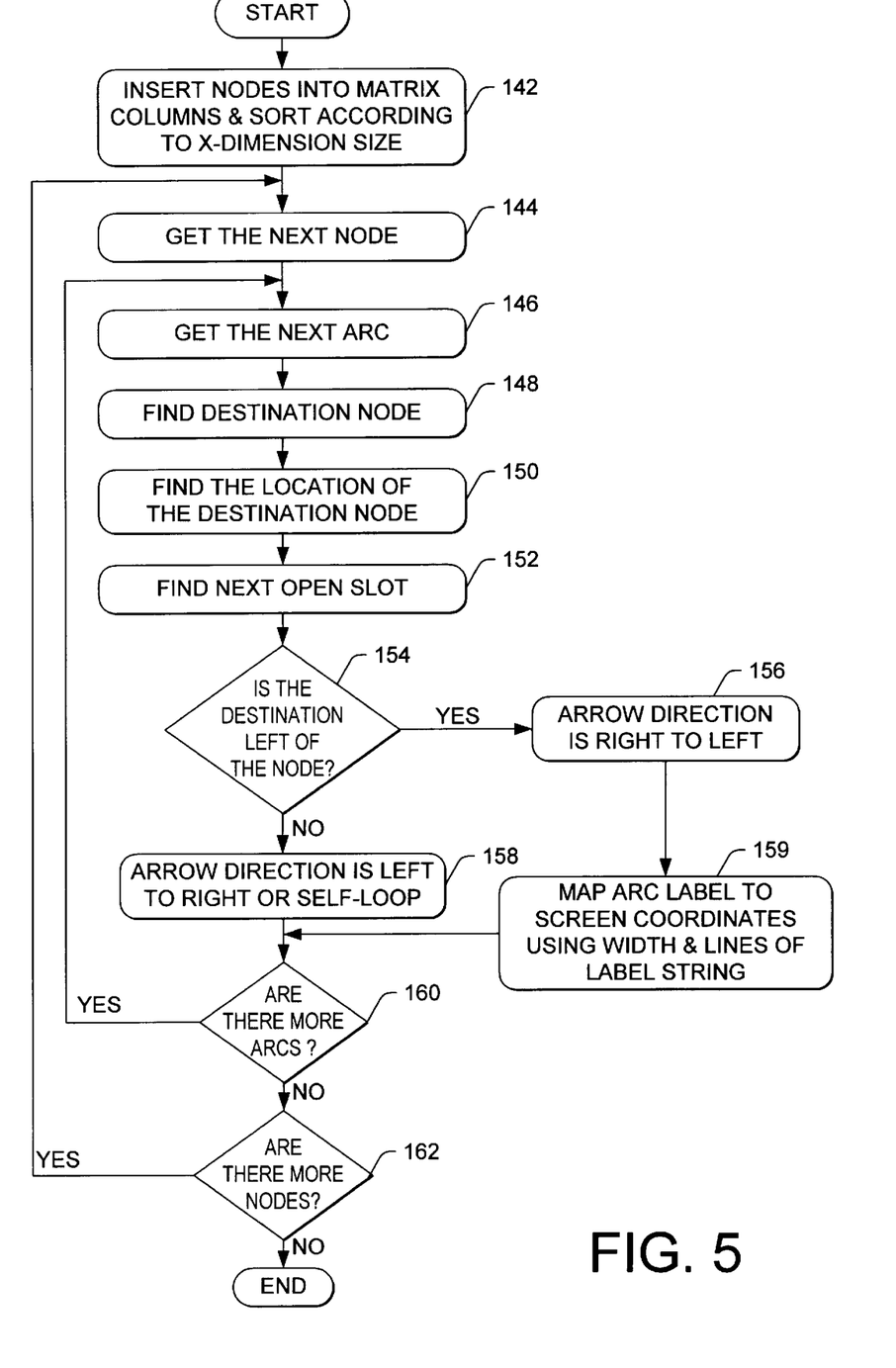

FIG. 5 is a flowchart illustrating the steps performed in determining the direction of arcs in a graph according to the present invention. Block 142 represents the computer 100 first sorting the nodes of the graph according to their size along the horizontal or x-dimension. Block 144 represents the computer 100 obtaining the next node in the list as the currently selected node. Block 146 represents the computer 100 obtaining the next arc from the currently selected node as the currently selected arc. Block 148 represents the computer 100 obtaining the destination node for the currently selected arc. Block 150 represents the computer 100 determining the location of the destination node. Block 152 represents the computer 100 determining the next open slot or row of the graph, which may preferably be determined by a best-fit or a first-fit method. Decision block 154 represents the computer 100 determining whether the destination node is located to the left of the currently selected node. If so, block 156 represents the computer 100 setting the arc or arrow direction from right to left and block 159 represents the computer 100 mapping the arc label to the screen coordinates using width and number of lines of the label string; otherwise, block 158 represents the computer 100 setting the arc or arrow direction from left to right, or else the arc comprises a self-loop. Decision block 160 represents the computer 100 determining whether there are more arcs left for the currently selected node which have not been examined. If so, control returns to block 146; otherwise, control transfers to block 162. Decision block 162 represents the computer 100 determining whether there are more nodes left in the graph which have not been examined. If so, control returns to block 144.

EXAMPLE

Figure 6A:
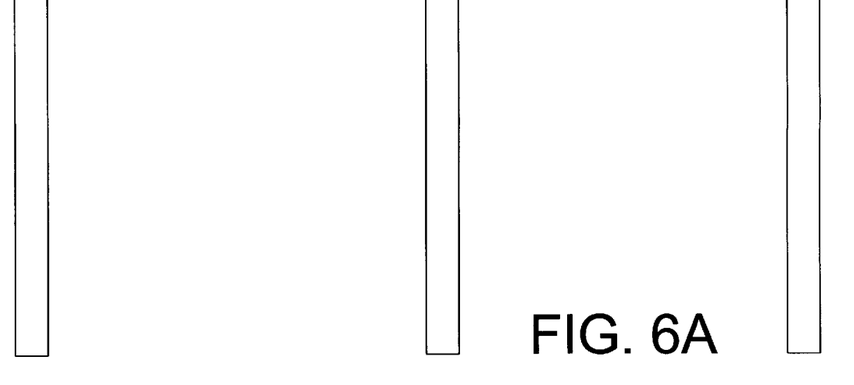
FIGS. 6A–6F are block diagrams illustrating various phases of the output graph of an arc-dominated labelled graph constructed according to the present invention.

The present invention transforms the graph of FIG. 2 into that shown by FIG. 3 by applying the above-described method in the following manner and as illustrated by FIGS. 6A through 6F:

Step 1. The three nodes of the graph are positioned vertically in the matrix as shown in FIG. 6A. The three nodes take up three separate columns.

Figure 6B:
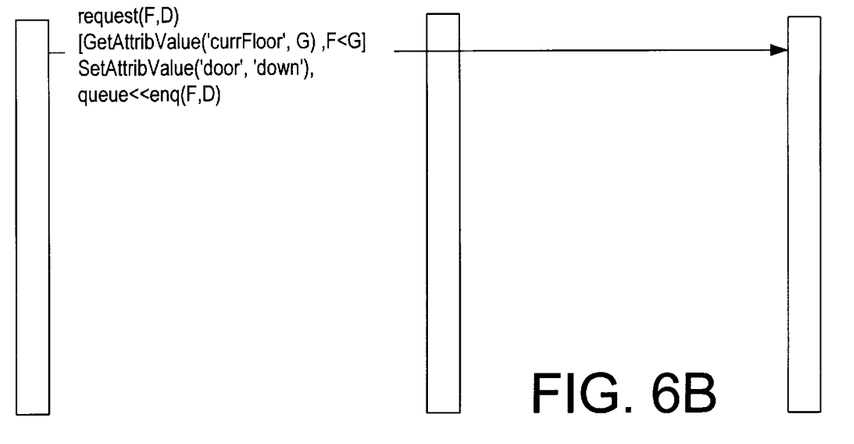

Step 2. The first arc from the first node is positioned in row 1, as shown in FIG. 6B.

Figure 6C:
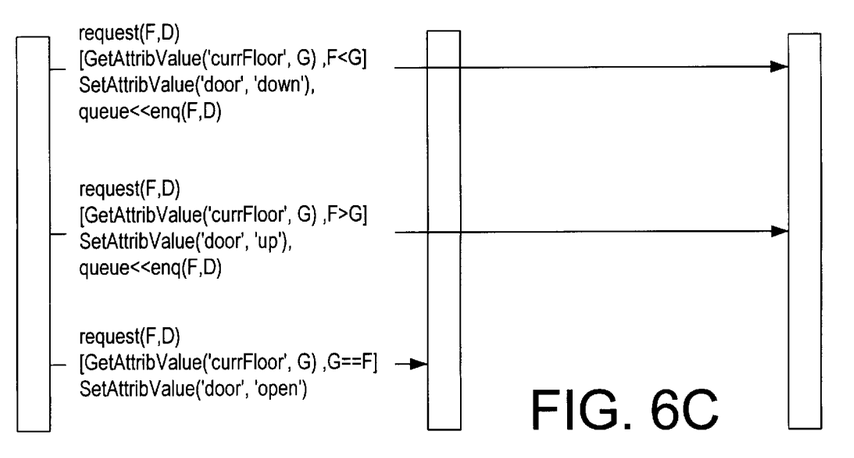

Step 3. All outgoing arcs from the first node are placed in the matrix, as shown in FIG. 6C.

Figure 6D:
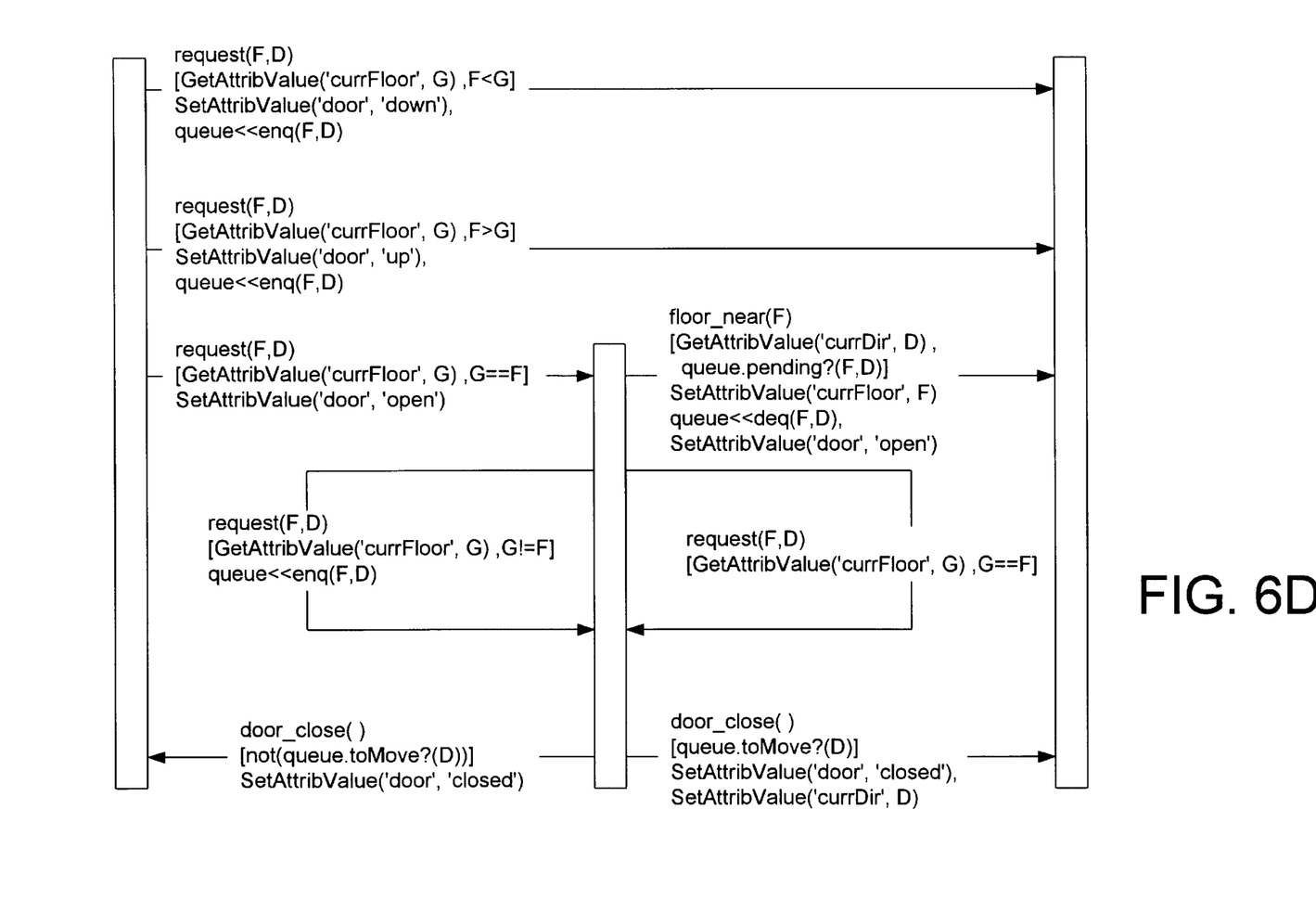

Step 4. All outgoing arcs from the second node are placed in the matrix, as shown in FIG. 6D.

Figure 6E:
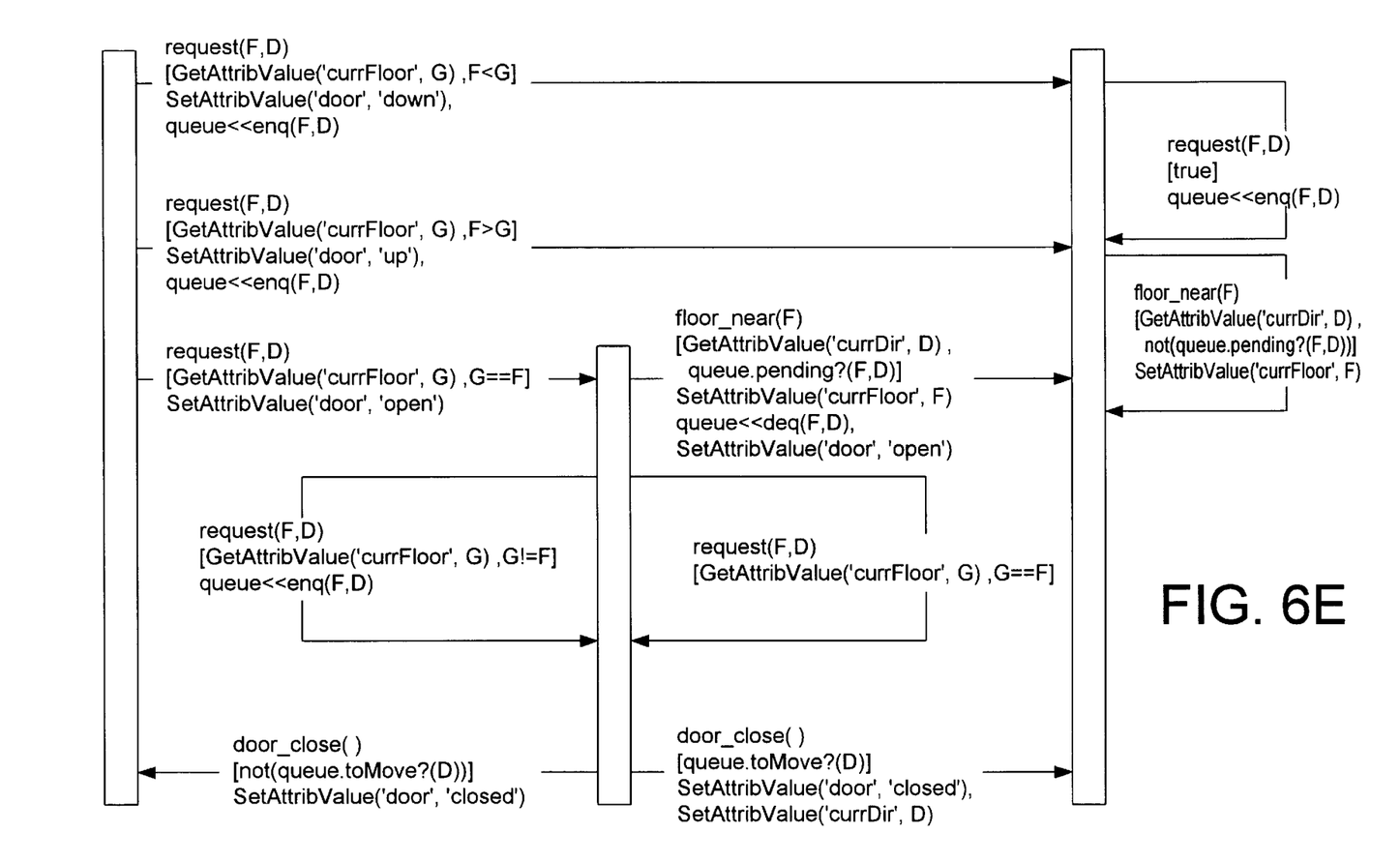

Step 5. All outgoing arcs from the third node are placed in the matrix, as shown in FIG. 6E.

Figure 6F:
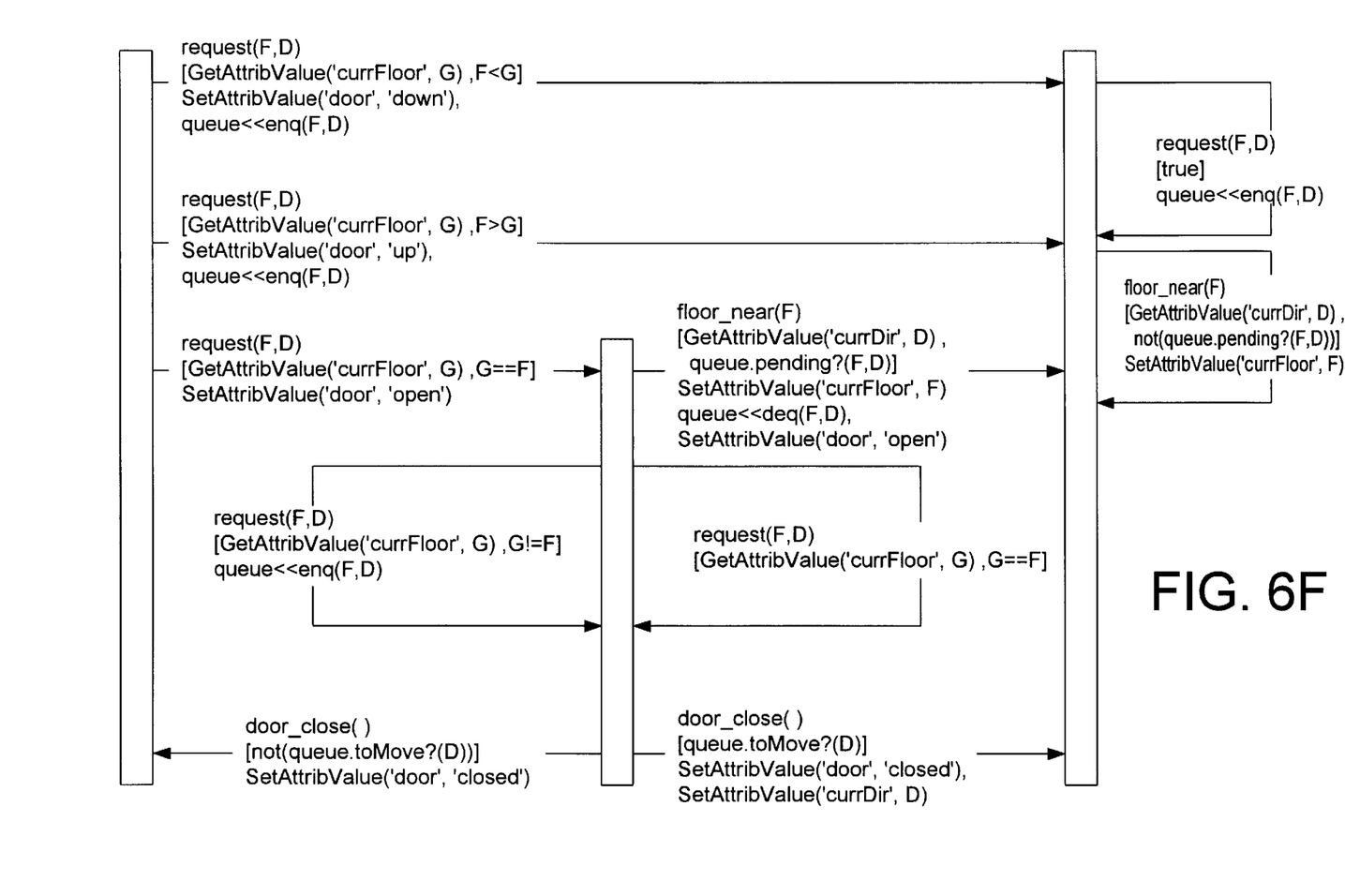

Step 6. The final output graph is shown in FIG. 6F. The matrix of FIG. 6F is similar to that show in FIG. 6E. The matrix of FIG. 6F is rendered in the following manner: first, all arcs are drawn, together with the labels; thereafter, the nodes are drawn. Nodes extend between rows which have arcs either starting or ending in such nodes.

Pseudo-code

Pseudo code for one embodiment of a computer program 118 that lays out arc-dominated labelled graphs as described herein is set forth in Appendix I. Further, pseudo code for initializing the matrix, inserting an arc in the graph, checking to see if a row is available, and marking a row, is set forth in Appendix II.

In the Appendices, NodeIntersectData is the name of a class that encapsulates the layout matrix, GetToNode is a function that returns the destination node for a given arc, and isMember is a function that returns the index of a node in the node list. Because nodes are represented as columns in the matrix, isMember returns the index of the column in the layout matrix which the node occupies.

In procedure UpdateRowColMaxes, it is sufficient if each node extends between certain rows, but not all nodes must extend from the first to the last row. For example, the STOPPED node shown in FIG. 3 extends from the top of the graph to a point where two SELF arcs are attached. If this node were instead made to extend to the bottom of the graph, it would cross the two request arcs from DEAD to MOVING, and result is a less aesthetically pleasing graph. Therefore, only nodes between rows that have arcs for that node are marked. For example, if the smallest row that has an arc attached to a node is I and the largest is J, the node is displayed only between rows I and J.

Procedure RefreshNodeIcons is a display function to mark the vertical extent of nodes. For example, as shown in FIG. 3, it is necessary for each node to extend between some rows depending on the number of arcs. This display function reduces unnecessary intersections of nodes with arcs.

Conclusion

In conclusion, the present invention discloses a computerized layout method for an arc-dominated labelled graph. A display area of a monitor is divided into a two dimensional grid of rows and columns. Each node of the labelled graph is assigned to a column, and each arc of the labelled graph to assigned to a row. When laying out arcs, four conditions are observed. First, two arcs connected to the same node are assigned different rows. Second, two arcs assigned to the same row do not have an overlap in the columns. Third, an arc with a distinct source node and a destination node is represented as a line from the source node to the destination node. Fourth, an arc describing a self-loop is represented as one or more lines having an identical source and destination node in the row.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

APPENDIX I

```
void LayoutData::SetupArcsAndNodes(Base* object)
{
    Base            *node, *arc;
    int             count;
    NodeIntersectData   intersect;
        //Defines a matrix to help compact arcs in the grid.
        //Given a source and a sink node, it tries to allocate
        //the smallest row which could accommodate the arc,
        //without intersecting existing arcs.
    SortByPosition(object->getNodeList ( ));
        //User to sort nodes; we sort them by their x-dim.
    //nodecnt is the total number of nodes in the object
    for (count=0; count < nodecnt; count++) {
        node = NodesArray[count] .ptr;   //get the next node
        while ((arc = node->GetNextArc( ))   != NULL) {
                //for each arc do
            Base *toNode    = ((Arc *)arc)->GetToNode( );
                            //find destination node
            int   toNum     = isMember(toNode);
                            //find posn. of destin.
            //now use the matrix to find the best possible
            //position to put this arc
            int   rank      =
                intersect.GetNextOpenSlot (count, toNum);
            //Look at the label for the arc, use line breaking
            //and keep track of width and height of the label
            //block
            if (toNum<count)     //Arrow is right to left
                UpdateRowColMaxes (arc, rank, toNum);
            else                 //SELF or left to right arc
                UpdateRowColMaxes(arc, rank, count);
        }
    }
}
//The main function
void NodeView::layoutNodesNArcs( )
{
    LayoutData *data = new LayoutData( );
    data->SetupArcsAndNodes (this);    //calls above function
    LayoutNodesAtTop (data);
        //layout the node labels in the top row of the grid
        while ((anArc = data->GetNextArcElement (fromNode, toNode))
    != NULL) {
        DrawArc (anArc, fromNode, toNode);
            //Use the actual screen coordinates to find start and
            //end coordinates of the arc, and then draw it.
        }
        RefreshNodeIcons (this);
            //Shows the rectangle for the nodes. Once all the arcs
            //have been drawn, we know for each node the extents
            //(earliest and latest rows which has arcs connected
            //to a node).
        delete newData;
}
```

APPENDIX II

```
(1) Initializing the matrix:
      totalRows = 0 //number of rows used so far
      //initialize all elements of matrix as FREE
      for (i=0; i<MaxNodes; i++)
        for (j=0; j<MaxArcs; j++) {
          matrix[i,j].left = FREE
          matrix[i,j].right = FREE
        }
(2) Inserting an arc in the graph
      GetNextOpenSlot (Source, Dest)
      //Source and Dest are the numbers of the source and
destination
      //nodes, respectively
      if (Source == Dest)//SELF loop
      {
        if (Source == 0) //Leftmost Node
          LookFor first open slot on "left"
        else if (Source == MaxNodes-1) //Rightmost Node
          Look for first open slot on "right"
        else //Internal node
        //Look for first open slot on either left or right
        Mark the found slot as INUSE
        RETURN ROW # of found SLOT
      }
      else if (Source > Dest) //Right to Left Arrow
      {
        for (i=0;i<totalRows;i++)
          if (isAvailable(i,Dest,Source)) {
            mark(i,Dest,Source);
            RETURN i;
          }
        totalRows++;
        mark (totalRows, Dest, Source);
        RETURN totalRows;
      }
      else if (Dest > Source) //Left to Right Arrow
      {
        for (i=0;i<totalRows;i++)
          if (isAvailable(i,Source,Dest)) {
            mark (i, Source, Dest);
            RETURN i;
          }
        totalRows++;
        mark(totalRows, Source, Dest)
        RETURN totalRows;
      }
(3) isAvailable (Row, Start, End)
      if (matrix[Row,Start].right == INUSE)
        RETURN FALSE;
      if (matrix[Row,End].left == INUSE)
        RETURN FALSE;
      for (i=Start+1;i<End;i++)
        if (matrix[Row,i].left == INUSE ||
matrix[Row,i].right == INUSE)
          RETURN FALSE;
      RETURN TRUE;
(4) mark(Row,Start,End)
      matrix[Row,Start].right = INUSE;
      matrix[Row,End].left = INUSE;
      for (i=Start+1;i<End;i++)
        matrix[Row,i].left = matrix[Row,i].right = INUSE;
```

What is claimed is:

1. A computerized method for laying out an arc-dominated labelled graph stored in a memory of a computer, comprising the steps of:

(a) dividing a display area of a monitor attached to the computer into a two dimensional matrix of rows and columns, wherein each column of the two dimensional matrix represents a single node of the labelled graph and each row of the two dimensional matrix represents at least one arc of the labelled graph;

(b) rendering arcs in the two dimensional matrix by assigning each arc of the labelled graph to a single row of the two-imensional matrix such that: (1) two arcs connected to the same node are assigned different rows, (2) two arcs assigned to the same row do not overlap in the columns, (3) an arc with distinct source and destination nodes comprises a line from the column representing the source node to the column representing the destination node, and (4) an arc describing a self-loop comprises multiple lines in the column representing a single source and destination node; and (c) displaying the two-dimensional matrix in the display area on the monitor.

2. The method of claim 1, further comprising the step of adding a new column to the display area when a new node is added to the labelled graph.

3. The method of claim 1, further comprising the step of assigning a new arc to an open row.

4. The method of claim 3, further comprising the step of adding a new row if there is no open row.

5. The method of claim 1, further comprising the step of adjusting the dimensions of a cell formed by an intersection of a row and column according to a length of an arc assigned to the row and a size of an associated label.

6. An apparatus for laying out an arc-dominated labelled graph, comprising:

(a) a computer, having a memory and a monitor attached thereto;

(b) means, performed by the computer, for dividing a display area of the monitor into a two dimensional matrix of rows and columns, wherein each column of the two dimensional matrix represents a single node of the labelled graph and each row of the two dimensional matrix represents at least one arc of the labelled graph;

(c) means, performed by the computer, for rendering arcs in the two dimensional matrix by assigning each arc of the labelled graph to a single row of the two-dimensional matrix such that: (1) two arcs connected to the same node are assigned different rows, (2) two arcs assigned to the same row do not overlap in the columns, (3) an arc with distinct source and destination nodes comprises a line from the column representing the source node to the column representing the destination node, and (4) an arc describing a self-loop comprises multiple lines in the column representing a single source and destination node; and (d) means, performed by the computer, for displaying the two-dimensional matrix in the display area on the monitor.

7. The apparatus of claim 6, further comprising means for adding a new column to the display area when a new node is added to the labelled graph.

8. The apparatus of claim 6, further comprising means for assigning a new arc to an open row.

9. The apparatus of claim 8, further comprising means for adding a new row if there is no open row.

10. The apparatus of claim 6, further comprising means for adjusting the dimensions of a cell formed by an intersection of a row and column according to a length of an arc assigned to the row and a size of an associated label.

11. An article of manufacture comprising a program storage device, readable by a computer, tangibly embodying one or more programs of instructions executable by the computer to perform a method for laying out an arc-dominated labelled graph stored in a memory of the computer, the method comprising the steps of:

(a) dividing a display area of a monitor attached to the computer into a two dimensional matrix of rows and columns, wherein each column of the two dimensional matrix represents a single node of the labelled graph and each row of the two dimensional matrix represents at least one arc of the labelled graph;

(b) rendering arcs in the two dimensional matrix by assigning each arc of the labelled graph to a single row of the two-dimensional matrix such that: (1) two arcs connected to the same node are assigned different rows, (2) two arcs assigned to the same row do not overlap in the columns, (3) an arc with distinct source and destination nodes comprises a line from the column representing the source node to the column representing the destination node, and (4) an arc describing a self-loop comprises multiple lines in the column representing a single source and destination node; and (c) displaying the two-dimensional matrix in the display area on the monitor.

12. The article of manufacture of claim 11, wherein the method further comprises the step of adding a new column to the display area when a new node is added to the labelled graph.

13. The article of manufacture of claim 11, wherein the method further comprises the step of assigning a new arc to an open row.

14. The article of manufacture of claim 13, wherein the method further comprises the step of adding a new row if there is no open row.

15. The article of manufacture of claim 11, wherein the method further comprises the step of adjusting the dimensions of a cell formed by an intersection of a row and column according to a length of an arc assigned to the row and a size of an associated label.

* * * * *

UNITED STATES PATENT AND TRADEMARK OFFICE
CERTIFICATE OF CORRECTION

PATENT NO. : 6,011,559
DATED : January 4, 2000
INVENTOR(S) : Dipayan Gangopadhyay and Subrata Mitra It is certified that error appears in the above-identified patent and that said Letters Patent is hereby corrected as shown below:

Column 3, line 53, "current direction" should read --current_direction--.

Column 4, line 22, "current dir :" should read --current_dir :--.

Column 9, line 66, "two-imensional" should read --two-dimensional--.

Signed and Sealed this

Fifteenth Day of May, 2001

*Attest:*

NICHOLAS P. GODICI

*Attesting Officer*     *Acting Director of the United States Patent and Trademark Office*